United States Patent
Sawada et al.

[11] Patent Number: 5,439,424
[45] Date of Patent: Aug. 8, 1995

[54] CVT CONTROL SYSTEM

[75] Inventors: Makoto Sawada, Atsugi; Hiromitsu Sakai; Nobuaki Mochizuki, both of Isehara, all of Japan

[73] Assignee: Nissan Motor Co., Ltd., Yokohama, Japan

[21] Appl. No.: 205,362

[22] Filed: Mar. 3, 1994

[30] Foreign Application Priority Data
Mar. 3, 1993 [JP] Japan .................................. 5-067505

[51] Int. Cl.⁶ .......................................... B60K 41/12
[52] U.S. Cl. .................................. 477/46; 477/48
[58] Field of Search ................. 477/43, 44, 46, 48

[56] References Cited
U.S. PATENT DOCUMENTS
4,658,360  4/1987  Osanai et al. .................. 477/43 X
5,175,685 12/1992  Hibi ................................ 477/46 X Primary Examiner—Charles A. Marmor
Assistant Examiner—Peter Kwon
Attorney, Agent, or Firm—Foley & Lardner

[57] ABSTRACT

A CVT control system comprises a controller. The controller determines the desired engine speed as a first function of operator power demand and vehicle speed during a predetermined period involving a momenet when a control element moves off from one of the maximum and minimum reduction ratio command positions, and determines the desired engine speed as a second function of the operator power demand and the vehicle speed during the subsequent period to the predetermined period.

22 Claims, 14 Drawing Sheets

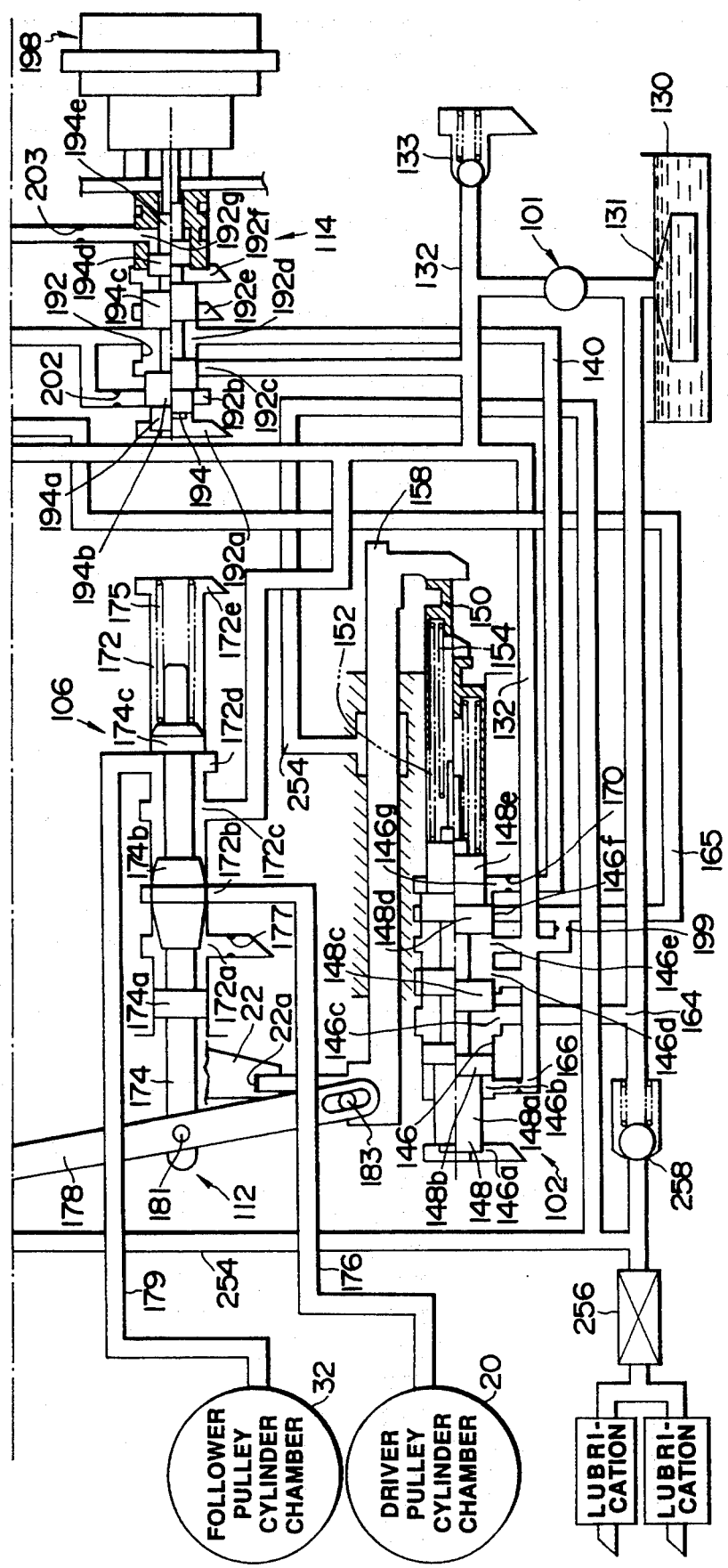

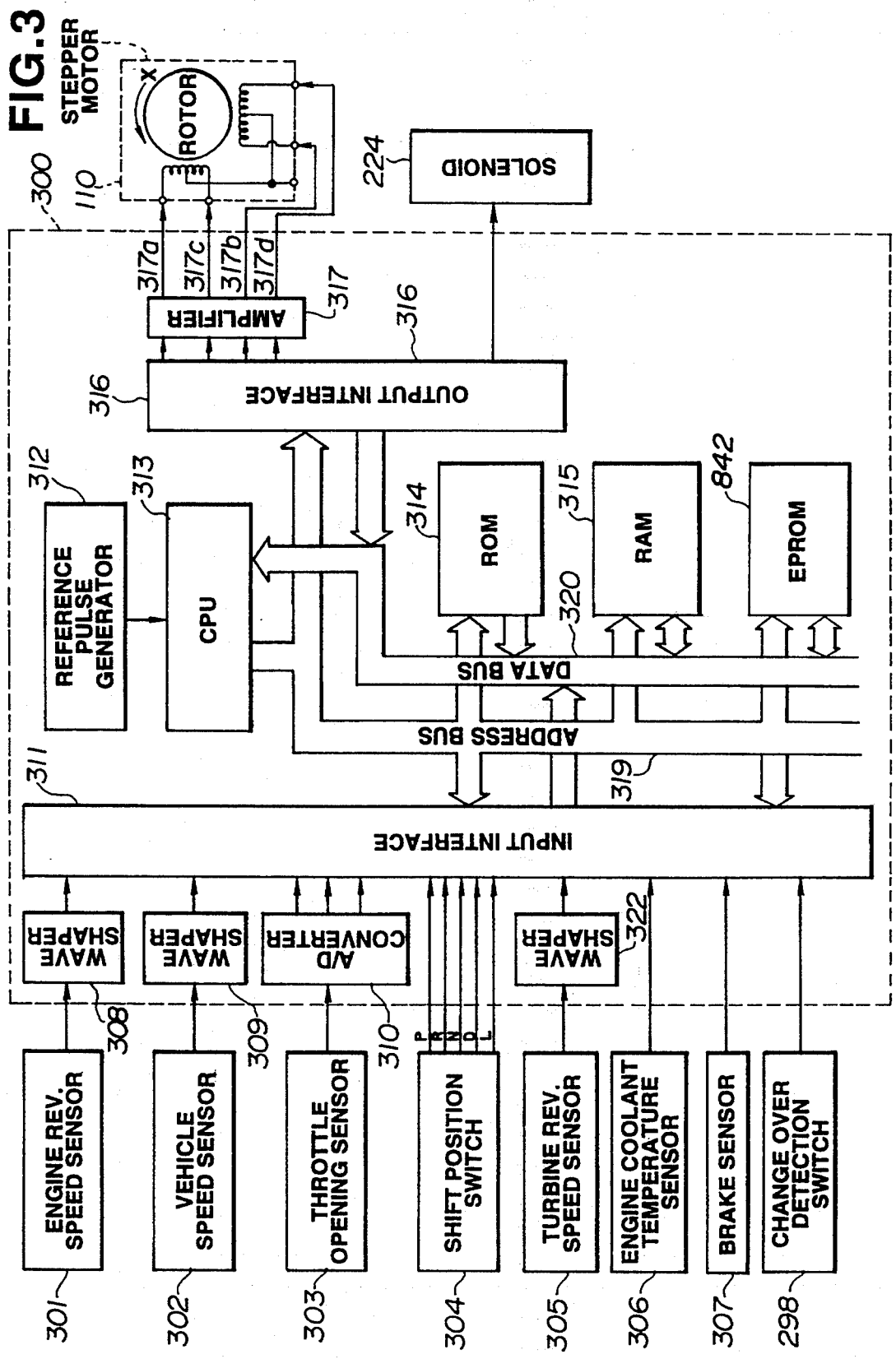

CVT CONTROL SYSTEM

BACKGROUND OF THE INVENTION

The present invention relates to a control system for a continuously variable transmission (CVT).

Previously, there have been various methods to control the reduction ratio in the CVT. The most popular way is to define a desired engine speed in response to throttle opening degree and vehicle speed and then control a reduction ratio of the CVT to adjust the actual engine speed to achieve the desired engine speed. JP-A 61-105351 uses a predetermined engine speed map which contains various desired engine speed values against various throttle opening degrees and vehicle speeds and defines a desired engine speed using this predetermined map.

What is encountered as difficulty to overcome is to suppress overshoot of the engine speed due to hydraulic delay after a ratio control element has moved off from one reduction ratio command position to another reduction ratio command position. For example, during acceleration from the maximum reduction ratio, there occurs a delay in pressure build-up in a driver pulley cylinder chamber, causing the engine speed to keep increasing until a new smaller reduction ratio is established upon elapse of the delay after the ratio control element has moved off from the maximum reduction ratio command position. Upon attainment of the new reduction ratio, the engine speed is decreased to achieve a new desired engine speed corresponding to the new reduction ratio.

SUMMARY OF THE INVENTION

The present invention uses improved controller means which develops a command indicative of the desired engine speed, develops a control signal insuch a manner as to bring the actual engine speed into agreement with the desired engine speed and applys the control signal to a ratio control element. The controller means determines the desired engine speed as a first function of the operator power demand and the vehicle speed during a predetermined period involving a moment when the ratio control element moves off from a predetermined one command position of the various command positions thereof, and determines the desired engine speed as a second function of the operator power demand and the vehicle speed during the subsequent period to the predetermined period.

Specifically, the controller means determines the desired engine speed as a first function of the operator power demand and the vehicle speed until initiation of a decrease in the actual engine speed after the ratio control element has stayed at the predetermined command position to establish the maximum reduction ratio, and determines the desired engine speed as a second function of the operator power demand and the vehicle speed upon and after the initiation of the decrease in the actual engine speed.

According to the most preferred implementation of the invention, the controller means determines the desired engine speed as a first function of the operator power demand and the vehicle speed until initiation of a decrease in the actual engine speed after the ratio control element has stayed at the first predetermined command position to provide the maximum reduction ratio;

the controller means determines the desired engine speed as a second function of the operator power demand and the vehicle speed upon and after the initiation of the decrease in the actual engine speed;

the controller means determines the desired engine speed as a third function of the operator power demand and the vehicle speed until initiation of an increase in the actual engine speed after the ratio control element has stayed at the second predetermined command position to provide the minimum reduction ratio; and the controller means determines the desired engine speed as the second function of the operator power demand and the vehicle speed upon and after the initiation of the increase in the actual engine speed.

BRIEF DESCRIPTION OF THE DRAWINGS

FIGS. 2A and 2B and when combined, are a hydraulic circuit of a hydraulic control system;

FIG. 3 is a block diagram of a CVT controller;

DETAILED DESCRIPTION OF TEE INVENTION

Figure 1:
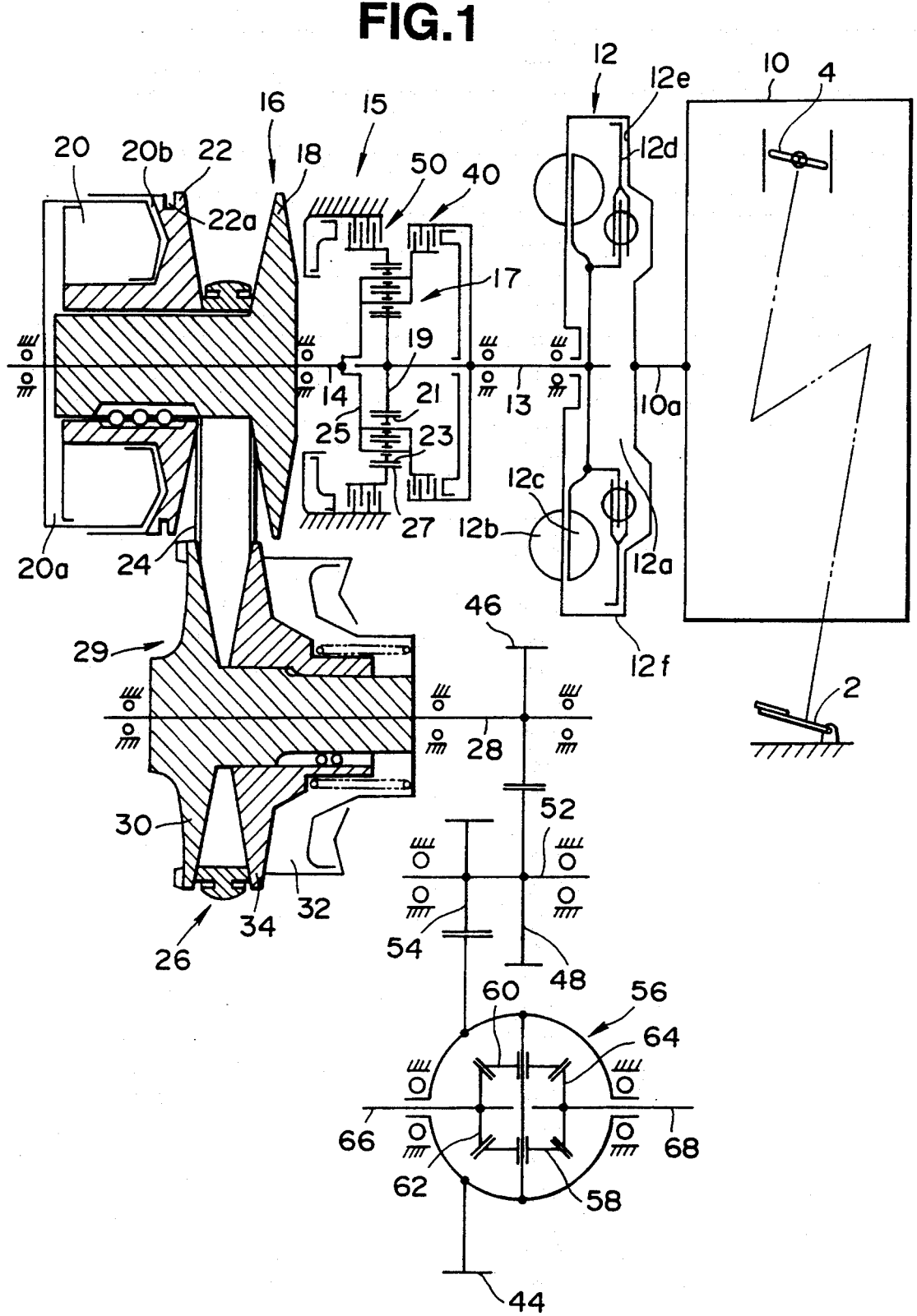
FIG. 1 is a schematic view of a continuously variable transmission (CVT) incorporated in a transaxle drivingly connected to an engine.

Referring to FIG. 1, a block 10 represents an engine. The engine 10 has a throttle 4 which opens in degrees in response to depressed position of a gas pedal 2. The engine 10 is drivingly connected to a hydrokinetic torque transmitting unit in the form of a fluid coupling 12. The fluid coupling 12 is drivingly connected to a continuously variable transmission (CVT) 29. The transmission 29 is drivingly connected to a final drive 56. The CVT 29 includes a driver pulley 16, a follower pulley 26 and a V-belt 24. It will be understood that the present invention is not limited to the use of CVT's with pulley V-belt power transfer. The present invention is operational with any other type of CVT in which the ratio can be controlled, including traction drive type CVT's.

Figure 2A:
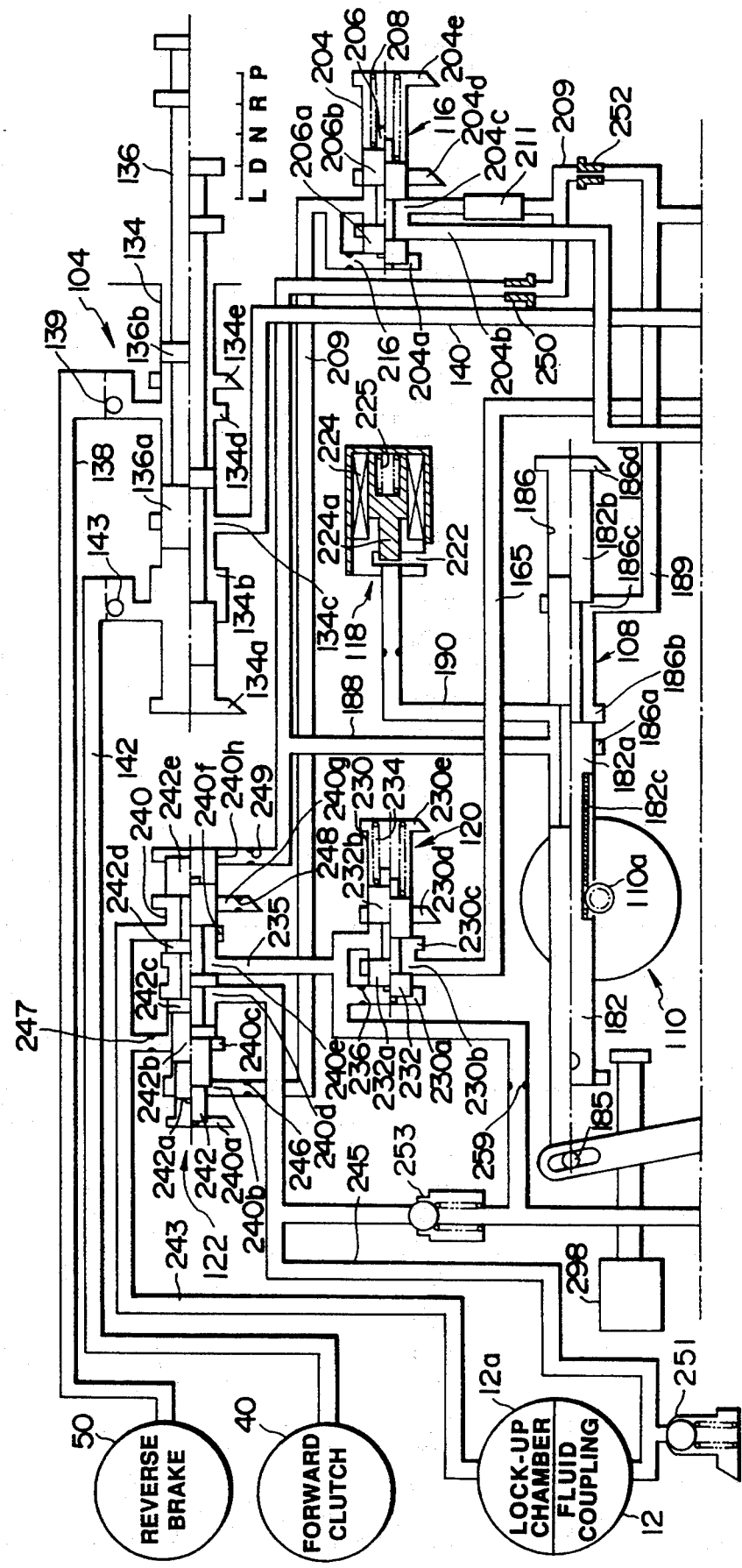

Referring to FIGS. 2A and 2B, the hydraulic control system includes a manual selector valve 104 manually operable by the vehicle operator to any one of desired positions (e.g., L, D, N, R, P), an actuator in the form of a stepper motor 110, a ratio control element in the form of a rod 182 connected by rack and pinion to the stepper motor 110. The stepper motor 110 is under the control of a CVT controller 300.

Referring to FIG. 3, the controller 300 receives information from various sensors and sensor 301, a vehicle speed sensor 302, a throttle opening sensor 303, and a shift position switch 304. The engine speed sensor 301 generates an engine speed signal (Ne) indicative of the revolution speed of the engine output shaft 10a. The vehicle speed sensor 302 detects the revolution speed of an output shaft 28 of the CVT 29 and generates a vehicle speed signal (V) indicative of the detected revolution speed of the CVT output shaft 28. The throttle sensor 303 detects the opening degree of the throttle 4 and generates a throttle opening degree signal (TH) indicative of the detected opening degree of the throttle 4. The shift position switch 304 gives a shift position signal representative of which one of various positions the manual selector valve 104 is positioned to. These signals are input to the controller 300. The controller 300 outputs a control signal. The control signal is applied to a driver circuit for the stepper motor 110. Specifically, in response to the signals from the various sensors and switches, the controller 300 determines and outputs a pulse number (PA) as the control signal. Application of the control signal to the driver circuit turns the stepper motor 110 and thus moves the ratio control element 182 to a ratio command position corresponding to the determined pulse number. This relationship between the control signal and the command position of the ratio control element 182 will be used in determining the actual position which the ratio control element 182 is positioned to.

Referring again to FIGS. 2A and 2B, in response to the control signal, the stepper motor 110 moves the ratio control element 182 formed with a rack 182c meshing a pinion 110a. The ratio control element 182 moves a level 170. The lever 178 is pivotally connected to the ratio control element 182 at one end and to a positionable or axially moveable conical disc 22 of the driver pulley 16 at the other end. At a point between the two ends, the lever 178 is pivotably connected to a valve spool 174 of a shift control valve 106. This arrangement provides position feedback of the pulley to the valve. As the stepper motor 110 moves the lever 178, the shift control valve 106, in response to the movement of the valve spool 174, alters the hydraulic pressure in a hydraulic conduit 176 leading to the driver pulley cylinder chamber 20. The hydraulic pressure in a hydraulic conduit 179 leading to the follower pulley cylinder chamber 32 is unaltered and kept as high as the hydraulic pressure generated by a line pressure regulator 102. As the hydraulic pressure in the hydraulic conduit 176 is altered, the conical disc 22 moves. Movement of the conical disc 22 causes the V-belt 24 to move a conical disc 34 of the follower pulley 26. This causes the reduction ratio, i.e., a ratio of the input speed to the output speed, of the CVT 29 to change. As the conical disc 22 moves, the lever 178 moves, repositioning the valve spool 174, providing a means for the valve 106 to stop the positionable conical discs 22 and 34 from moving.

The reduction ratio changes continuously over a range limited by the maximum reduction ratio and by the minimum reduction ratio. FIG. 1 shows the position of the pulleys 16 and 26 and the V-belt 24 to establish the maximum reduction ratio. In this position, the hydraulic conduit 176 and the driver pulley cylinder chamber 20 are drained via a drain port 172a.

It will be understood that there is a so-called hydraulic delay till the initiation of actual shift from the maximum reduction ratio. In other words, the CVT 29 stays at the maximum reduction ratio state during this delay after the ratio control element 182 has moved off from the maximum reduction ratio command position to a new smaller ratio command position.

Detailed description of FIGS. 1, 2A, 2B and 3 is found in U.S. Pat. No. 5,067,372 issued on Nov. 26, 1991 in the name of Suzuki and assigned to the common assignee to which the present application is to be assigned, which patent is hereby incorporated by reference in its entirety. For further understanding, reference is made to this patent.

The implementation of the present invention into the above described hardware will be further explained below.

Figure 4:
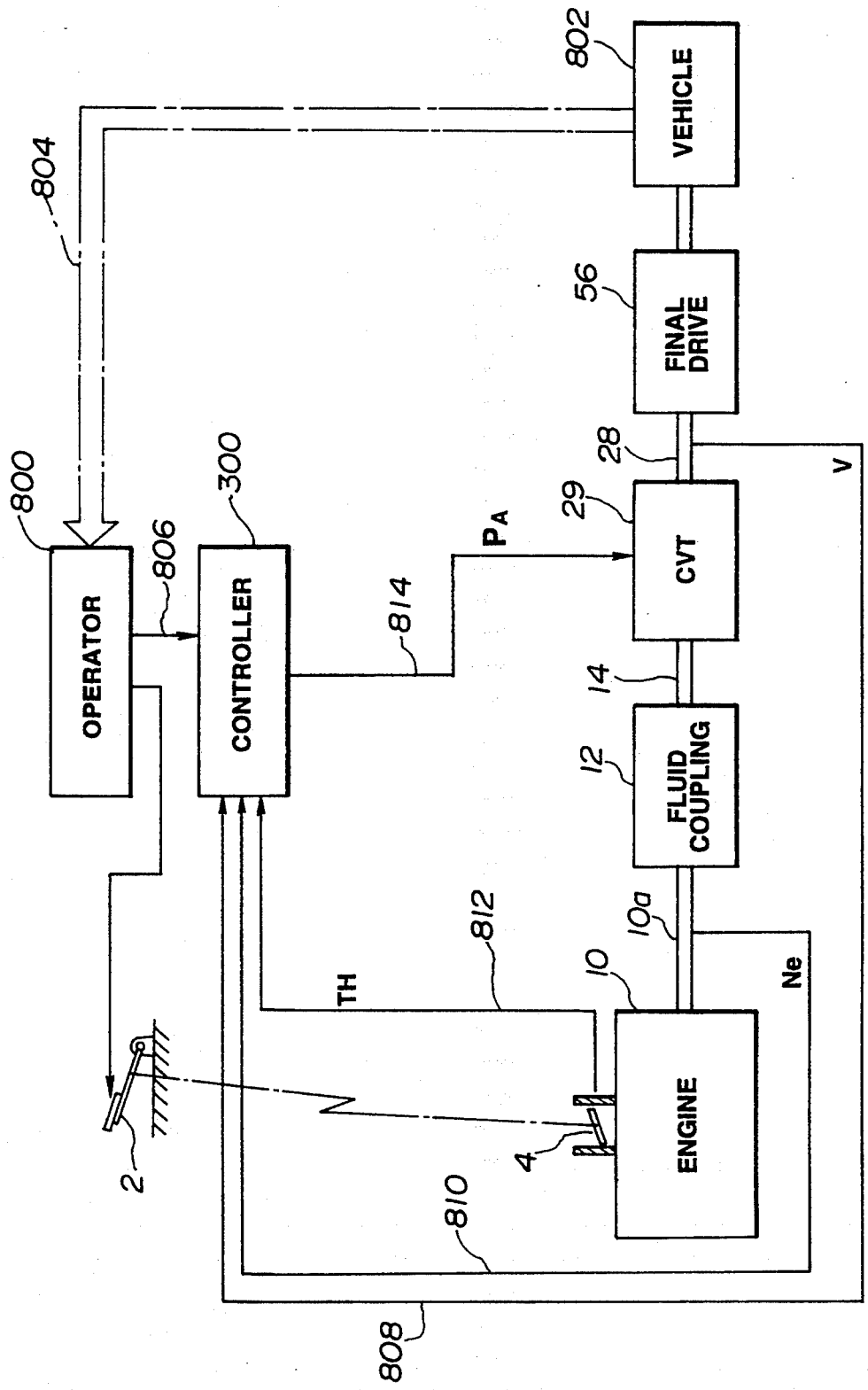
FIG. 4 is a block diagram showing the relationship between the controller, the engine and the CVT.

Referring to FIG. 4, a box 800 represents the vehicle operator and a box 300 represents the CVT controller. The throttle 4 controls the torque output of the engine 10, which outputs its power through the engine output shaft 10a. Via the fluid coupling 12, the engine power is transferred to the CVT input shaft 14. The CVT 29 transfers the engine power to the final drive 56 which moves the vehicle 802. All of the above components of the engine CVT drivetrain transfer the load of the vehicle 802 back to the engine 10.

The operator 800 perceives the state of the vehicle 802 through normal senses, represented by the feedback line 804. The operator 800 depresses or releases the gas pedal 2 sending a power output command to the throttle 4. In this embodiment, the opening degree of the throttle 4 represents the power output command. The operator 800 positions the manual selector valve 104 (see FIG. 2A) to send via the shift position switch 304 (see FIG. 3), the shift position signal to the controller 300 through line 806.

The controller 300 senses the states of the engine 10 and CVT 29 through lines 808, 810 and 812. Line 808 sends the vehicle speed signal (V) indicative of the revolution speed of the CVT output shaft 28 to the controller 300. Line 810 sends the engine speed signal (Ne) to the controller 300. Line 812 sends the throttle opening signal (TH) to the controller 300. In response to the engine and CVT states, the controller 300 sends the control signal indicative of reduction ratio command through a line 814 to the CVT 29. The ratio command on the line 814 controls the reduction ratio of the CVT 29 by controlling the stepper motor 110 and thus the ratio control element 182. Controlling the reduction ratio controls the engine speed.

Figure 5:
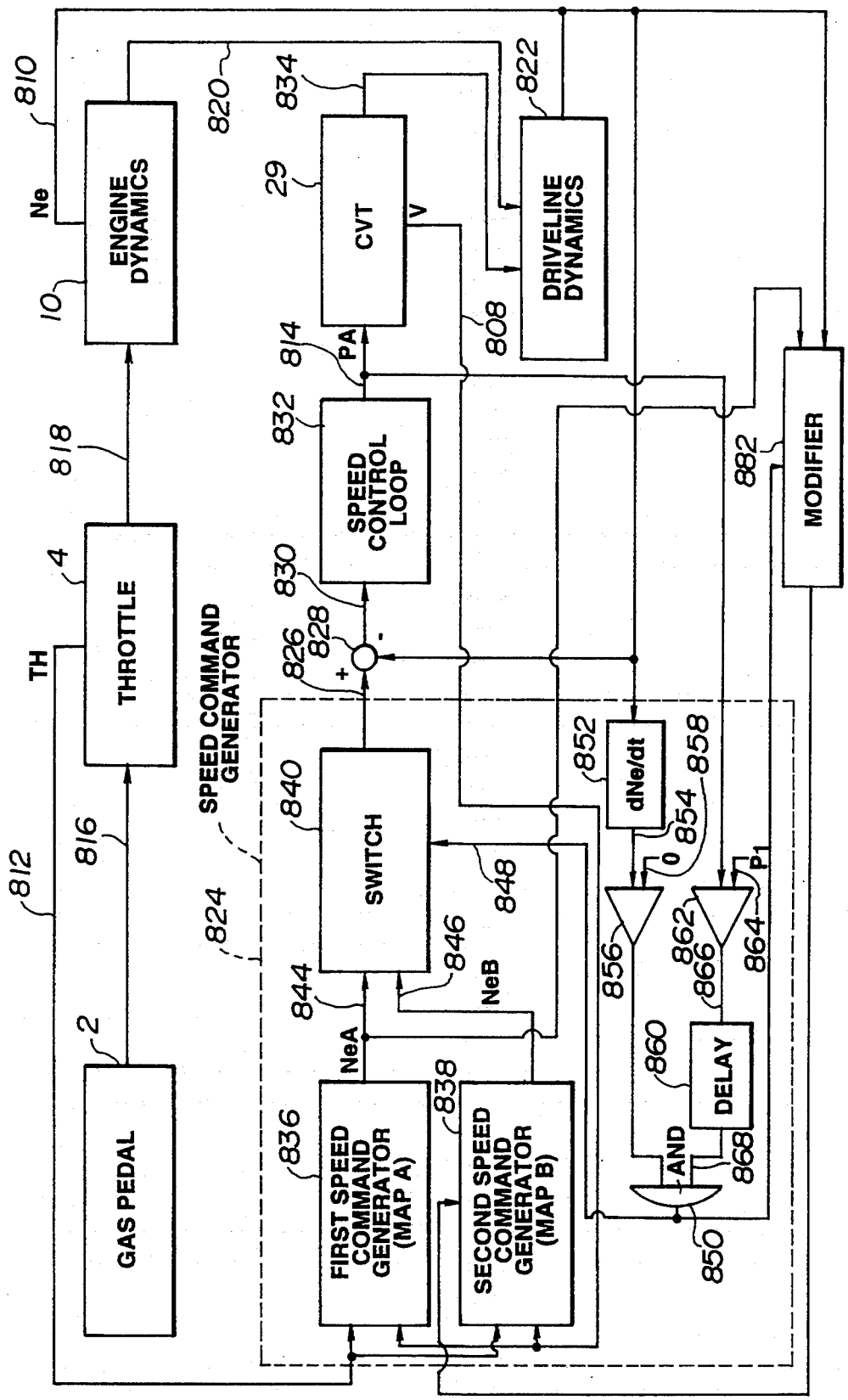
FIG. 5 is a control diagram showing control of engine speed through ratio control.

A preferred implementation of the present invention can be understood with reference to the control diagram in FIG. 5. The power command, represesented by line 816, from the gas pedal 2 is used as an input to the throttle 4 to control the opening degree of the throttle 4. The actual throttle opening degree, represented by line 818, controls the torque output of the engine 10. The output of the engine 10, represented by line 820, affects the vehicle driveline dynamics, represented by a box 822.

The throttle opening degree signal TH on line 812 is input into a speed command generator 824, which outputs a speed command signal on line 826. The speed command generator 824 is explained in detail later. The speed command signal on line 826 is input into a comparator 828, which compares the speed command with the actual engine speed Ne on line 810. An error signal is output on line 830 which is fed into a speed control loop 832. The speed control loop 832 may be a simple PID controller but is not so limited. The speed control loop 832 outputs the ratio command on line 814 and controls the reduction ratio of the CVT 29. Line 834, leading into box 822, illustrates that the change in the reduction ratio of the CVT 29 affects the driveline dynamics of the vehicle controlling the actual engine speed represented by line 810. The vehicle speed signal V on line 808 is also input into the speed command generator 824, which will be explained below.

Figure 8:
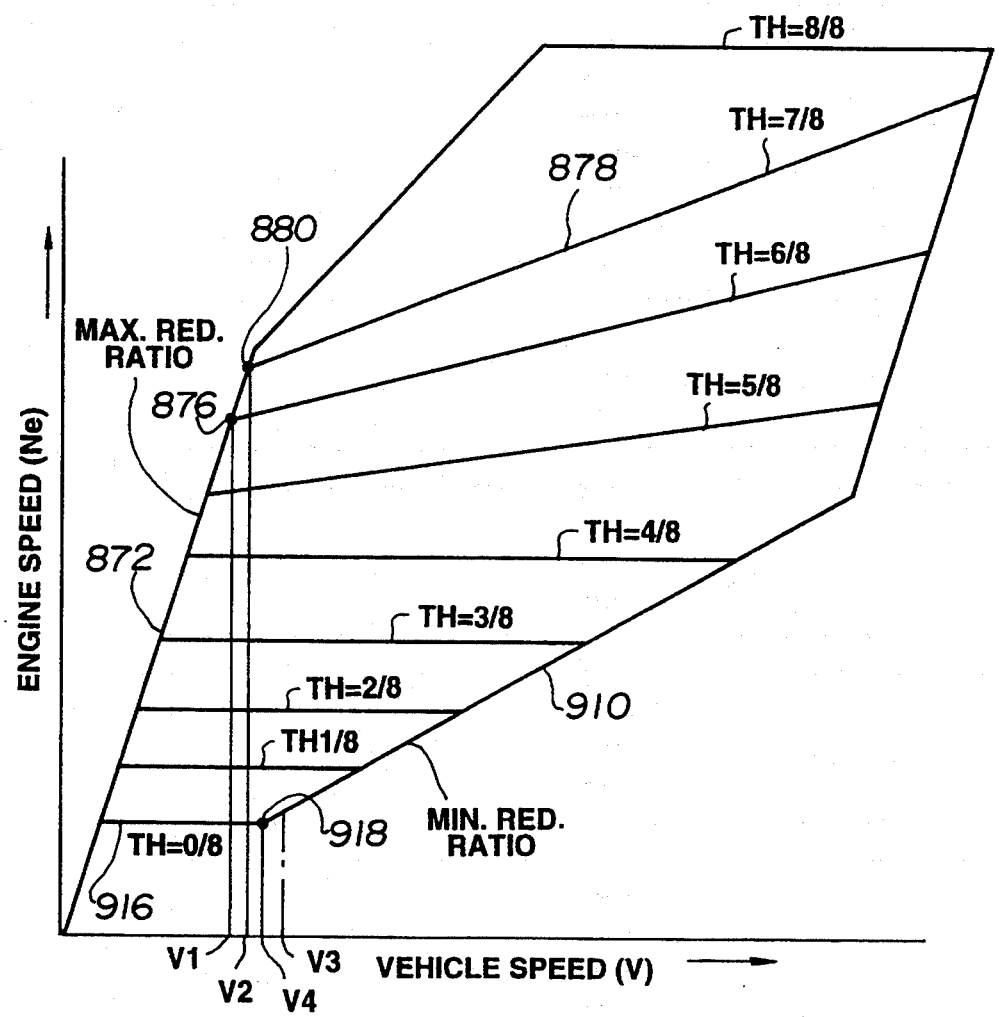
FIG. 8 is an engine speed map A.
Figure 9:
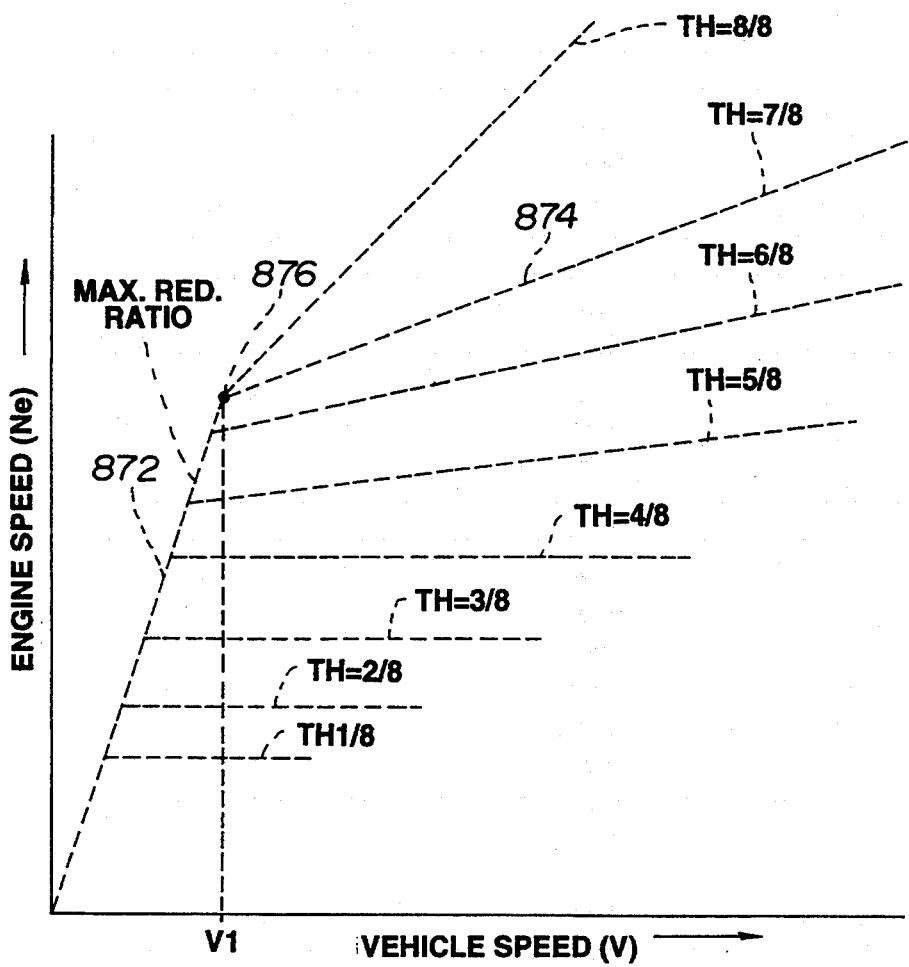
FIG. 9 is an engine speed map B.
Figure 11:
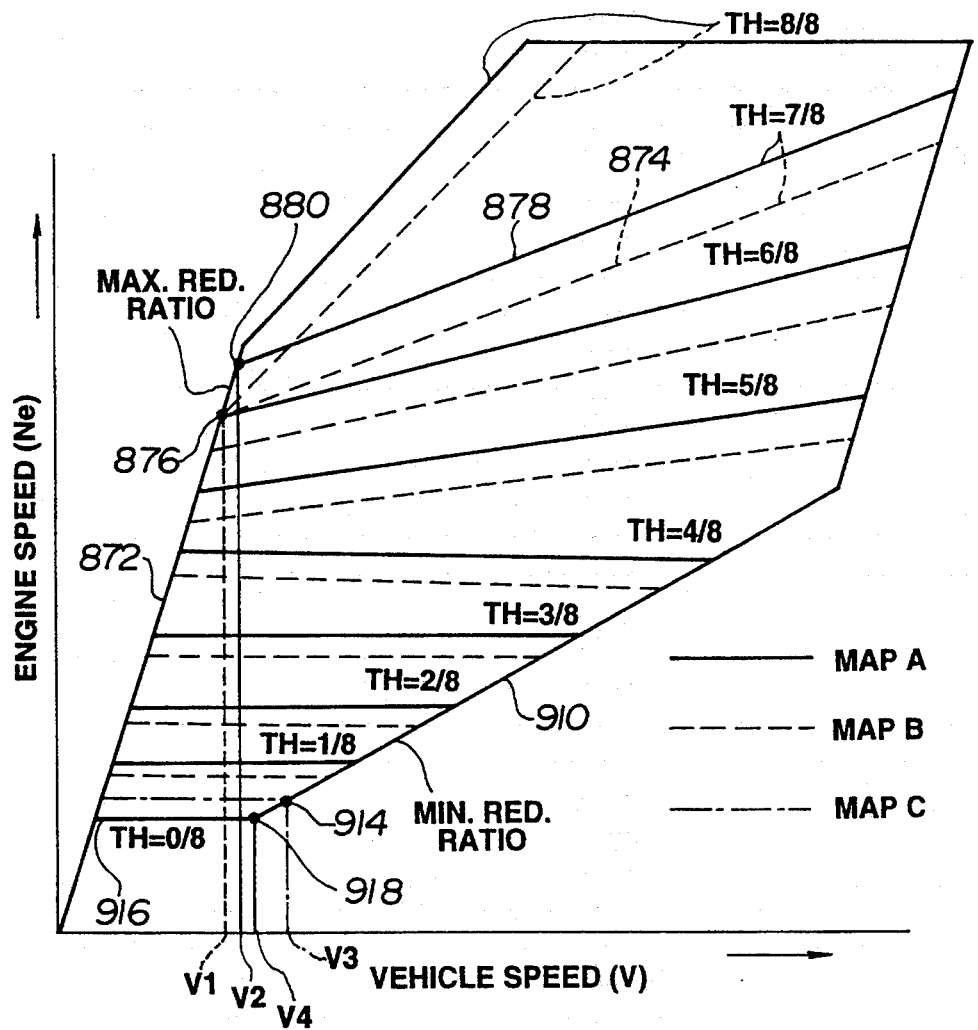
FIG. 11 is a representation of the maps A, B and C in superimposed manner.
Figure 12:
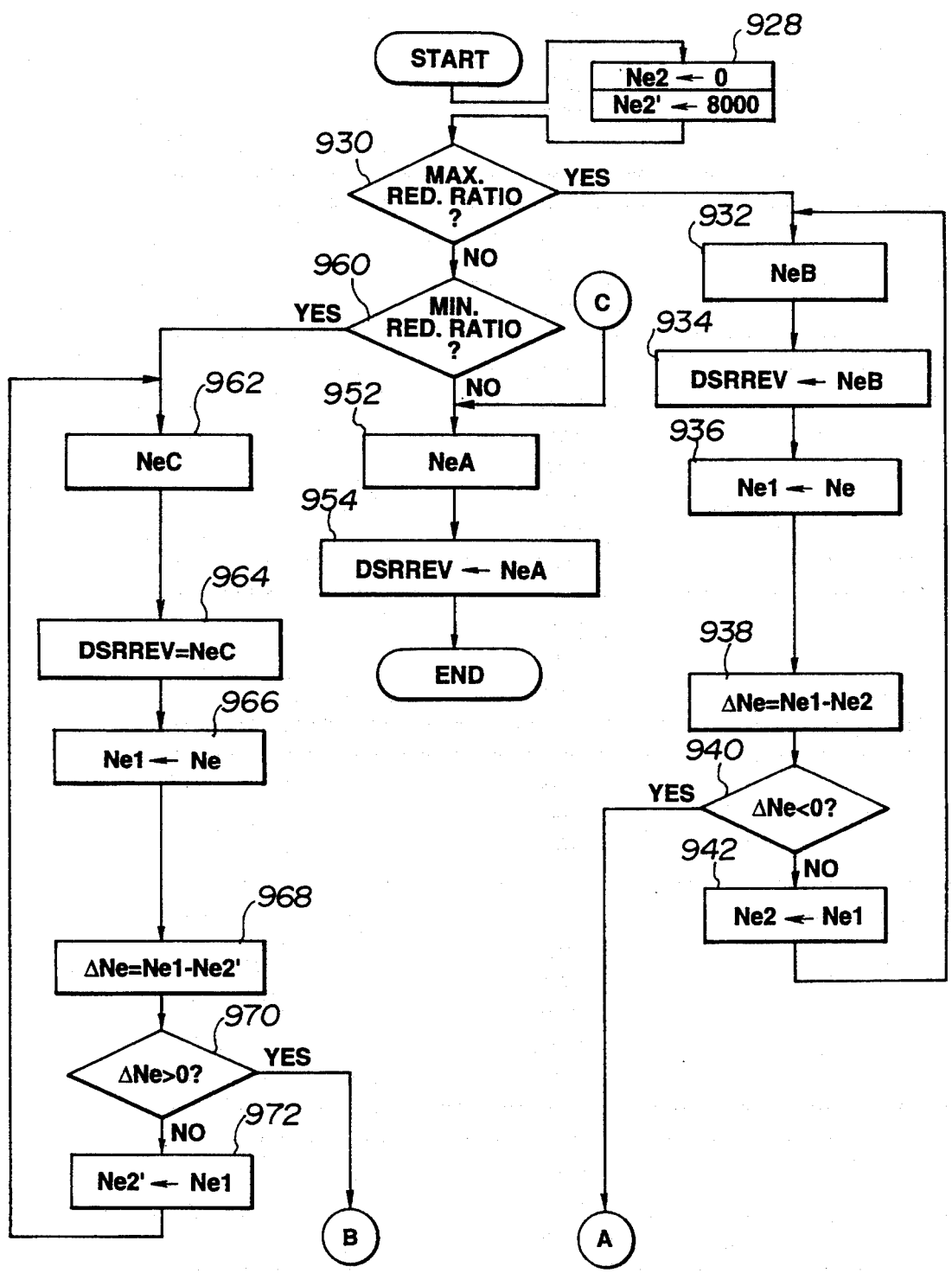
FIGS. 12 and 13 show a flow diagram of a control routine implementing the invention.
Figure 13:
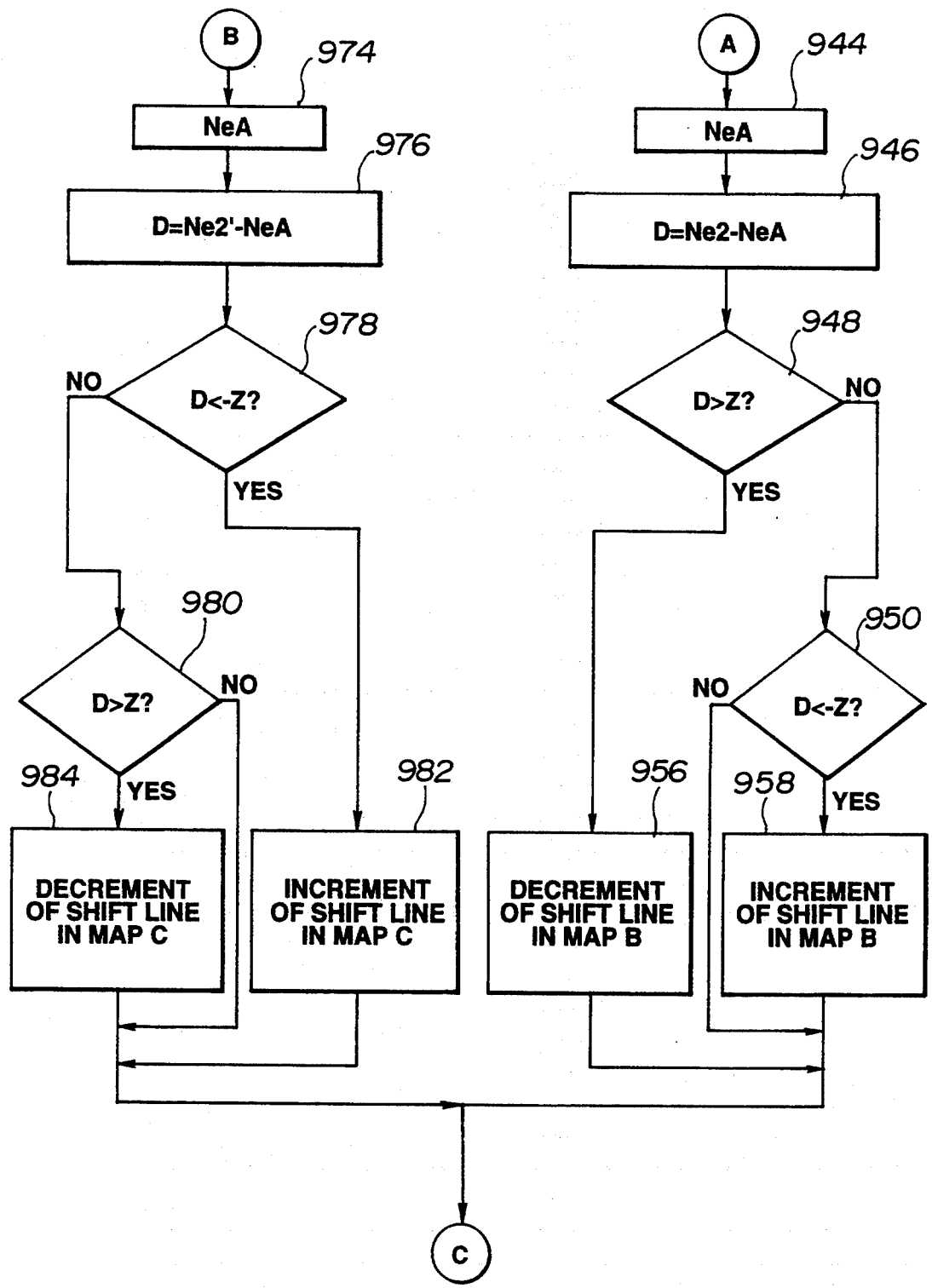

The speed command generator 824 includes a first speed command generator 836, a second speed command generator 838 and a switch 840. The first speed command generator 836 is a two dimensional look-up table of a map A programmed into a read only memory (ROM) 314 of the controller 300. The map A is illustrated in FIG. 8. The second speed command generator 838 is a two dimensional look-up table of a map B programmed into an eraseable programmable read only memory (EPROM) 842 of the controller 300. The map B is illustrated in FIG. 9. The relationship between the maps A and B is illustrated in FIG. 11. The first speed command generator 836 generates, as a function of throttle opening degree TH and vehicle speed V, a desired engine speed NeA on line 844. The second speed command generator 838 generates, as a function of throttle opening degree TH and vehicle speed V, a desired engine speed NeB on line 846. The desired engine speed NeB on line 846 is allowed to pass through the switch 840 and output on line 826 as the speed command signal when the switch 840 assumes a first position upon appearance of a logical "1" on line 848. When the logical "1" on line 848 changes to a logical "0", the switch 840 takes a second position wherein the desired engine speed NeA on line 844 is allowed to pass through the switch 840 and output on line 826 as the speed command signal.

The speed command generator 824 also includes a logical AND gate 850, which outputs the logical "1" or "0" on line 848. The actual engine speed Ne on line 810 is fed to a differential block 852. In this block 852, the first time derivative of the engine speed Ne is computed and the result is output on line 854. An operational amplifier 856 compares the output from the block 852 on line 854 with a reference value of 0 (zero) on line 858. The operational amplifier 856 outputs a logical "1" on line 860 when the output of the differential block 852 is greater than or equal to 0 (zero) or a logical "0" on line 860 when the output is less than 0 (zero). Line 860 leads to one input of the logical AND gate 850. The ratio command indicative signal PA on line 814 is fed as an input to an operational amplifier 862.

Figure 7:
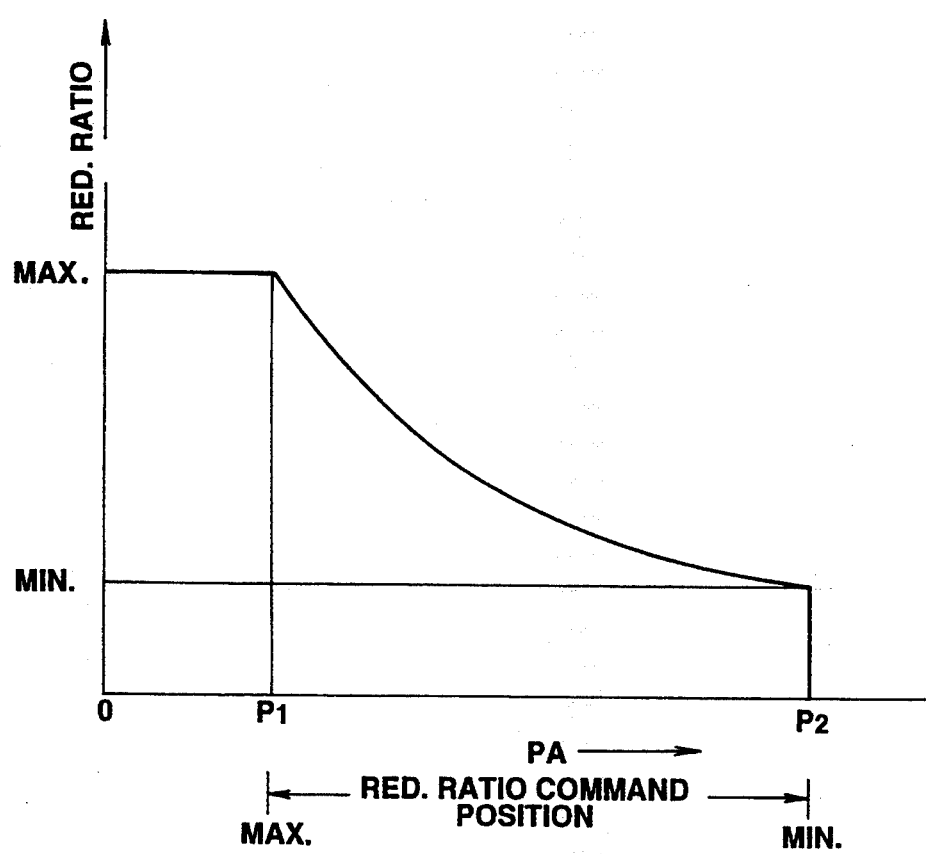
FIG. 7 is a graphical representation showing the relationship between various command positions which a ratio control element is positionable to and the corresponding reduction ratios established in the CVT.

Prior to explanation of the operational amplifier 862, the nature of the control signal PA on line 814 is explained with reference to FIG. 7. In FIG. 7, the horizontal axis represents the control signal (PA) and the corresponding position of the ratio control element 182, while the vertical axis represents the reduction ratio of the CVT 29. It will be understood that the ratio control element 182 is positioned at the maximum reduction ratio command position when the control signal PA is less than or equal to a predetermined value of P1. When the signal PA is greater than the value P1, the ratio control element 182 is positioned at one of various reduction ratio command positions excluding the maximum reduction ratio command position. When the signal PA is equal to another predetermined value of P2, the ratio control element 182 is positioned at the minimum reduction ratio command position. The value P2 is greater than the value P1.

Referring back to FIG. 5, the operational amplifier 862 compares the control signal PA on line 814 with the value P1 on line 864. The operational amplifier 862 outputs a logical "1" on line 866 when the signal PA on line 814 is less than or equal to the value P1 or outputs a logical "0" (zero) on line 866 when the signal PA is greater than the value P1. It will be understood that the level of signal on line 866 changes from logical "1" to logical "0" upon movement of the ratio control element 182 from the maximum reduction ratio command position in a direction reducing the reduction ratio. However, the signal transmission of this change to line 868 is delayed by a time delay represented by a box 870. The line 868 leads to the logical AND gate 850. The setting of the time delay 870 is determined based on the so-called hydraulic delay.

In start-up mode where the vehicle is driven to move from a standstill, the controller 300 works as follows. It is assumed that the maximum reduction ratio is established in the CVT 29. If the operator depresses the gas pedal 2 to open the throttle 4 to the degree ⅞ of the wide open throttle (WOP), i.e., TH=⅞, the actual engine speed increases. Since the signal on line 848 is logical "1", the desired engine speed NeB from the map B is output on line 826. As the vehicle speed V increases, the desired engine speed NeB increases along a maximum reduction ratio command line designed by the reference numeral 872 (see FIG. 9). The actual engine speed Ne increases along with increasing of the desired engine speed NeB given by the map B because the ratio control element 182 is held at the maximum reduction ratio command position to keep the maximum reduction ratio established in the CVT 29. In FIG. 9, a shift command line for TH=⅞, designated by the reference numeral 874, is connected to the line 872 at a point 876 which corresponds to a vehicle speed value of V1 on the horizontal axis. Until the vehicle speed V reaches the value V1, the desired engine speed NeB is given from the line 872 and the maximum reduction ratio is established in the CVT 29. Immediately after the vehicle speed V exceeds the value V1, the desired engine speed NeB is given by the shift line 874 and output on line 826, causing the control signal PA on line 814 to become greater than the value P1. This change in the control signal PA brings the ratio control element 182 into motion away from the maximum reduction ratio command position to a new smaller reduction ratio command position without any delay through turning of the stepper motor 110. However, owing mainly to a slow pressure build-up in the driver pulley cylinder chamber 20, the maximum reduction ratio is kept in the CVT 29. This delayed response allows the actual engine speed Ne to increase along the line 872 beyond the point 876 viewing in FIG. 9 as the vehicle speed V increases. After the delay, there occurs the initiation of ratio shift in the CVT 29, causing decrease of the actual engine speed Ne to bring the actual engine speed Ne into agreemenet with the desired engine speed NeB given from the shift line 874. When the first time derivative of the actual engine speed Ne becomes less than zero (negative), the logical AND gate 856 outputs logical "0" on line 860. Owing to the appropriate setting of the delay 870, the logical "1" is kept on line 868 so that the logical AND gate 850 keeps on outputting the logical "1" on line 848 leading to the switch 840 until the derivative dNe/dt becomes less than zero (negative) after the ratio control element 182 has moved off from the maximum reduction ratio command position. When and after the derivative dNe/dt becomes nagative, the logical "0" is output on line 848, causing the switch 840 to take the second position thereof. From this moment onwards, the desired engine speed NeA from the map A in FIG. 8 is output on line 826. Referring to FIG. 8, the desired engine speed NeA is given from a shift command line for TH=⅜, designated by the reference numeral 878. This shift line 878 is connected to the maximum reduction ratio command line 872 at a point 880 corresponding to a vehicle speed value of V2. Upon or immediately after a decrease in the actual engine speed Ne, the CVT 29 is controlled to alter the actual engine speed Ne into agreemenet with the desired engine speed NeA which is given from the shift line 878 of the map A. It is now understood that undesired drop in the engine speed Ne is minimized or at least reduced since the ratio control element 182 starts moving off from the maximum reduction ratio command position at early timing (see point 876 in FIG. 11) and the desired engine speed NeB given from the shift line 874 of map B is lower than the desired engine speed NeA given from the shift line 878 of map A.

For smooth variation in engine speed upon switching from the map B to the map A, a small difference is preferred between the actual engine speed Ne and the desired engine speed NeA which is given from the shift line 878 upon or immediately after occurrrence of a change in signal on line 848 from logical "1" to logical "0". According to the control in FIG. 5, the shift line 874 of the map B moves along the maximum reduction ratio command line 872 downwardly away from the shift line 878 of the map A or upwardly toward the shift line 878 of the map A in response to the above-mentioned difference viewing in FIG. 11. In this manner, the data making up the shift line of the map B are modified by a predetermined value in terms of engine speed. This operation is repeated until the difference becomes smaller than an allowable deviation range from the shift line 878 of map A. Thus, after modification of the map B, the smooth change in the engine speed is ensured. In FIG. 5, a modifier 882 computes a deviation (D) of the actual engine speed Ne, on line 810, from the desired engine speed NeA, on line 844, which is given from the map A in response to the change in signal on line 848 from logical "1" to logical "0". In the modifier 882, the computed deviation (D) is evaluated. The modifier 882 outputs instruction on line 884 in response to the evaluation. In response to this instruction on line 884, the controller 300 executes decrement of the data making up the shift line 874 of the map B in EPROM 842 by a predetermined value (Y) if the deviation (D) is greater than a value +Z or executes increment of the data of the shift line 874 of the map B if the deviation (D) is less than a value −Z. No modification is made if the deviation (D) falls in the so-called allowable deviation range limited by +Z and −Z.

Figure 6:
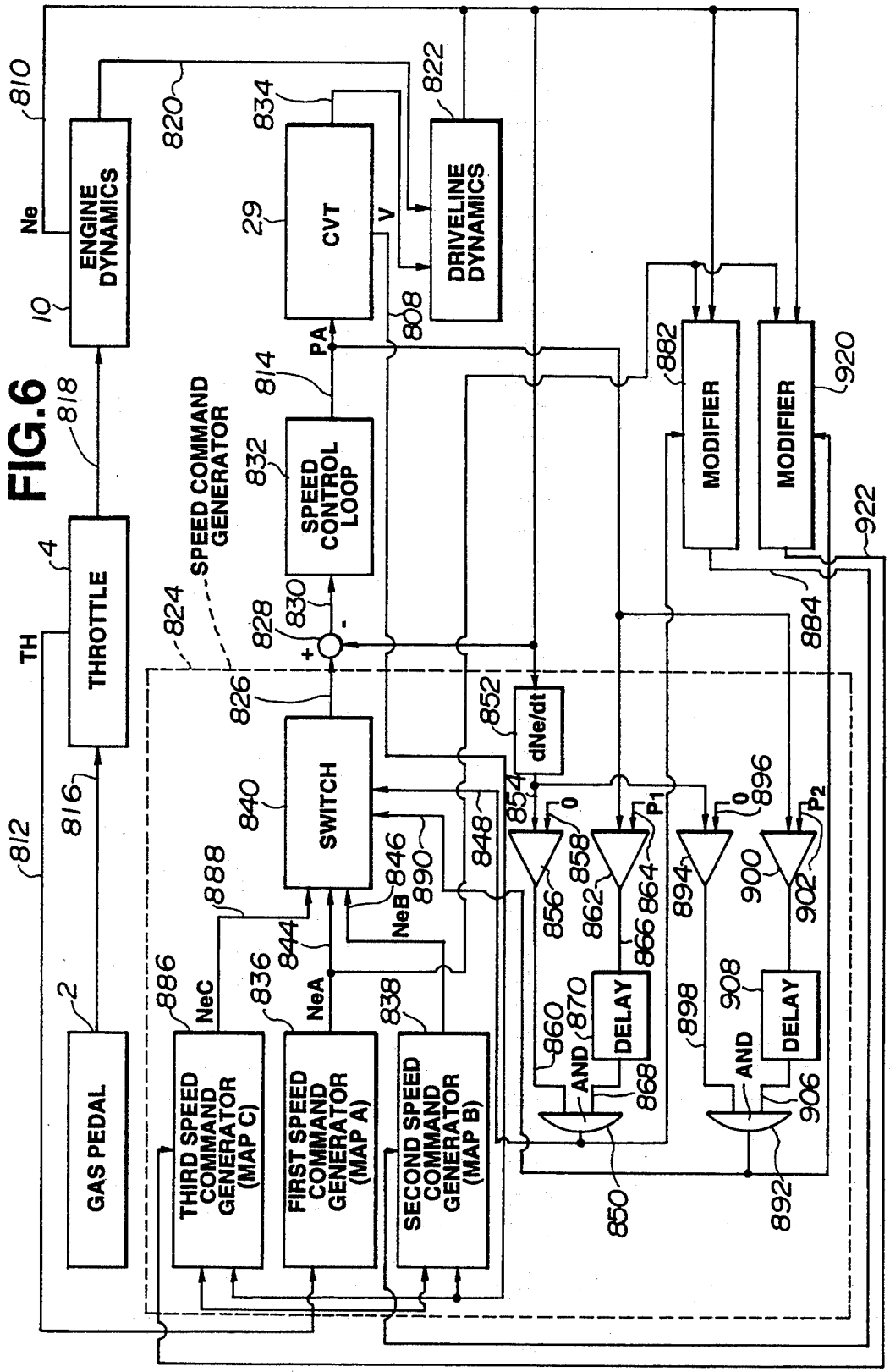
FIG. 6 is a control diagram showing another control of engine speed through ratio control.
Figure 10:
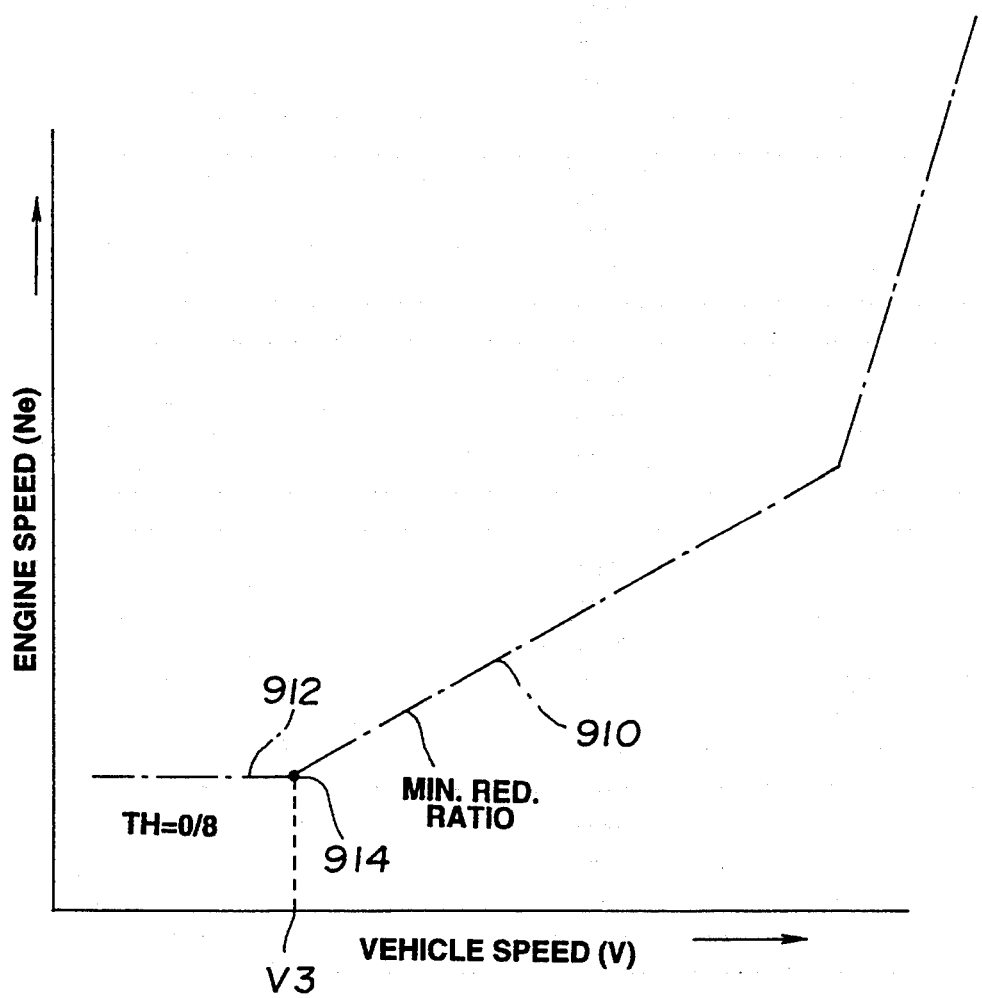
FIG. 10 is an engine speed map C.

The most preferred implementation of the invention is explained below with reference to FIG. 6. Referring to FIG. 6 in comparison with FIG. 5, it is understood that the same reference numerals are used through these Figures to designate like or similar parts or portions. In this most preferred implementation, the invention is used with a third speed command generator 886 that is a two dimensional look-up table of a map C (see FIG. 10) programmed into the EPROM 842 of the controller 300. The map C is illustrated in FIG. 10 and the relationship between this map C and the maps A and B is illustrated in FIG. 11. The third speed command generator 886 generates, as a function of throttle opening degree TH on line 812 and vehicle speed V on line 808, a desired engine speed NeC on line 888. The desired engine speed NeC on line 888 is allowed to pass through a switch 840 and output on line 826 as the speed command signal when the switch 840 assumes a third position upon appearence of a logical "1" on line 890. The relationship between the first, second and third positions which the switch 840 can take and the signals on lines 890 and 848 is as follows. If logical "1" signal is on line 848 and logical "0" signal on line 890, the switch 840 takes the first position. If logical "0" signals are on lines 848 and 890, the switch 840 takes the second position. If logical "0" signal is on line 848 and logical "1" signal is on line 890, the switch 840 takes the third position. Line 890 leads from a logical AND gate 892. An operational amplifier 894 compares the output signal, on line 854, of the differential block 852 with a reference value 0 (zero) on line 896. The operational amplifier 894 outputs logical "1" on line 898 when the output signal, i.e., dNe/dt, on line 854 is less than or equal to 0 (zero) or logical "0" on line 898 when the output of the differential block 852 is greater than 0 (zero). Line 898 leads to one input of the logical AND gate 892. The ratio command indicative control signal PA on line 814 is fed as an input to an operational amplifier 900. The operational amplifier 900 compares the control signal PA on line 814 with the value P2 on line 902. The operational amplifier 900 outputs a logical "1" on line 904 when the signal PA is greater than or equal to the value P2 or outputs a logical "0" (zero) when the signal PA is less than the value P2. It will be understood that the level of signal on line 904 changes from logical "1" to logical "0" upon movement of the ratio control element 182 from the minimum reduction ratio command position in a direction increasing the reduction ratio. However, the signal transmission of this change to line 906 is delayed by a time delay represented by a box 908. The setting of this time delay 908 is determined based on due consideration of the so-called hydraulic delay.

During deceleration initiated by release of the gas pedal 2 when the vehile travels with the CVT 29 operating with the minimum reduction ratio, the controller 300 works as follows. It is now assumed that the minimum reduction ratio is established in the CVT 29 and the vehicle is travelling at high vehicle speeds. If the operator releases the gas pedal 2 to close the the throttle 4, i.e., TH=0/8, the actual engine speed decreases. The logical AND gate 892 outputs a logical "1" on line 890 leading to the switch 890, while the logical AND gate 850 outputs a logical "0" on line 848. Thus, the switch 840 is at the third position so that the desired engine speed NeC from the map C is output on line 826. As the vehicle speed decreases, the desired engine speed NeC decreases along a minimum reduction ratio command line designated by the reference numeral 910 in FIG. 10. The actual engine speed Ne decreases along with decreasing of the desired engine speed NeC given from the minimum reduction ratio command line 910 of the map C as the vehicle speed decreases because the ratio control element 182 is held at the minimum reduction ratio command position to keep the minimum reduction ratio established in the CVT 29. In FIG. 10, a shift command line for TH=0/8, designated by the reference numeral 912, is connected to the minimum reduction ratio command line 910 at a point 914 which corresponds to a vehicle speed value of V3 on the horizontal axis. Until the vehicle speed V decreases down to the value V3, the desired engine speed NeC is given from the line 910 and the minimum reduction ratio is established in the CVT 29. Immediately after the vehicle speed drops below the value V3, the desired engine speed NeC is given from the shift line 912 and output on line 826, causing the control signal PA on line 814 to become less than the value P2. This change in the control signal PA bring the ratio control element 182 into motion away from the minimum reduction ratio command position to a new greater reduction ratio command position without any delay through turning of the stepper motor 110. However, owing mainly to a slow pressure drop in the driver pulley cylinder chamber 20, the minimum reduction ratio is kept in the CVT 29. This delayed response allows the actual engine speed Ne to decrease along the line 910 beyond the point 914 viewing in FIG. 10 as the vehicle speed V decreases. After the delay, there occurs the initiation of ratio shift in the CVT 29, causing increase of the actual engine speed Ne to bring the speed Ne into agreement with the desired engine speed NeC given from the shift line 912. When the first time derivative of the actual engine speed Ne becomes greater than zero (positive), logial "0" is output on line 898. Owing to the appropriate setting of the delay 908, logical "1" is kept on line 906, so that the logical AND gate 892 keeps on outputting the logical "1" on line 890 leading to the switch 840 until the derivative dNe/dt becomes greater than zero (positive) after the ratio control element 182 has moved off from the minimum reduction ratio command position. When and after the derivative dNe/dt becomes positive, the logical AND gate 892 outputs logical "0" on line 890, causing the switch 840 to take the second position thereof. From this moment onwards, the desired engine speed NeA from the map A in FIG. 8 is output on line 826. Referring to FIG. 8, the desired engine speed NeC is given from a shift command line 916 for TH=0/8. This shift line 916 is connected to the minimum reduction ratio command line 910 at a point 918 which corresponds to a vehicle speed value of V4. Upon or immediately after the increase in the actual engine speed Ne, the CVT 29 is controlled to alter the actual engine speed Ne into agreement with the desired engine speed NeA which is given from the shift line 916 of the map A. It is now understood that undesired increase in the engine speed Ne is minimized or at least reduced since the ratio control element 182 starts moving off from the minimum reduction ratio command position at the early timing (see point 914 in FIG. 11) and the desired engine speed NeC given from the shift line 912 of map C is higher than the desired engine speed NeC given from the shift line 916 of map A.

For smooth variation in engine speed upon switching from the map C to the map A, a modifier 920 computes a deviation (D) of the actual engine speed Ne on line 810 from the desired engine speed NeA, on line 844, which is given from the map A in response to the change in signal on line 890 from logical "1" to logical "0". In the modifier 920, the computed deviation (D) is evaluated. The modifier 920 outputs instruction on line 922 in response to the evaluation. In response to this instruction on line 922, the controller 300 executes increment of the data making up the shift line 912 of the map C in EPROM 842 by a predetermined value if the deviation (D) is less than a value −Z or executes decrement of the data of the shift line 912 of the map C if the deviation (D) is greater than a value +Z. No modification is made if the deviation falls in the so-called allowable deviation range limited by −Z and +Z.

The flow diagram in FIGS. 7 and 8 illustrates a control routine of the speed command generator 824 and modifiers 882 and 920 of the most preferred implementation of the present invention. Although not shown, the controller 300 inputs information of the control signal PA. At a step 928, the controller 300 initializes the data of Ne2 and Ne2' by setting 0 (zero) at Ne2 and setting an upper limit of the engine speed, e.g., 8000, at Ne2'. At a step 930, the controller 300 compares PA with the value P1 to determine whether the ratio control element 182 is at the maximum reduction ratio command position or not. If this is the case, the controller 300 next inputs, at a step 932, throttle opening degree TH and vehicle speed V to perform a table look-up operation of the map B in FIG. 9 to determine a desired engine speed NeB for throttle opening degree TH and vehicle speed V. The controller 300 next updates, at a step 934, a desired engine speed command DSRREV with the desired engine speed NeB. At the next step 936, the controller 300 inputs actual engine speed Ne as a current engine speed data Ne1. At the next step 938, the controller 300 computes delta Ne by subtracting the data of Ne2 from the data of Ne1. At the next step 940, the controller 300 compares the delta Ne with 0 (zero) to determine whether delta Ne is less than 0 or not. Since initially Ne2 is zero, delta Ne is positive. Thus, the controller 300 updates, at the next step 942, the data of Ne2 with the data of Ne1 and then returns to the step 932. A loop of operation, consisting of steps 932, 934, 936, 938, 940 and 942, continues until the controller 300 determines, at step 940, delta Ne becomes negative and lower than 0.

At a moment immediately after the controller 300 has determined, at step 940, that delta Ne has become negative, the controller 300 performs, at a step 944, a table look-up operation of the map A using throttle opening degree TH and vehicle speed V to determine a desired engine speed NeA. Then, at the next step 946, the controller 300 computes a deviation D by subtracting the data of NeA from the data of Ne2. At a step 948, the controller 300 determines whether the deviation D is greater than a predetermined value of Z or not. If D is less than or equal to Z, the controller 300 determines, at the next step 950, whether the deviation D is less than a predetermined value −Z or not. If D is greater than or equal to −Z, the controller 300 performs, at a step 952, a table look-up operation of the map A using throttle opening degree TH and vehicle speed V. The controller 300 next updates, at a step 954, the desired engine speed command DSRREV with the desired engine speed NeA.

In the subsequent run of this control routine, the controller 300 determines, at the step 930, that PA is greater than P1, and next determines, at a step 960, whether PA has reached the value P2 or not. If it determines that PA is less than P2, the controller 300 performs the steps 952 and 954.

Subsequently, if it determines at the step 960 that PA is equal to P2 and thus the ratio control element 182 is at the minimum reduction ratio command position, the controller 300 performs, at the next step 962, the table look-up operation of the map C using throttle opening degree TH and vehicle speed V to determine a desired engine speed NeC. Then, the controller 300 updates, at the next step 964, the desired engine speed command DSRREV with the desired engine speed NeC. At the next step 966, the controller 300 inputs actual engine speed Ne as a current engine speed data Ne1. At the next step 968, the controller 300 computes delta Ne by subtracting the data of Ne2' from the data of Ne1. At the next step 970, the controller 300 compares the delta Ne with 0 (zero) to determine whether delta Ne is greater than 0 or not. Since initially Ne2' is 8000, delta Ne is negative. Thus, the controller 300 updates, at the next step 972, the data of Ne2' with the data of Ne1 and then returns to the step 962. A loop of operation, consisting of steps 962, 964, 966, 968, 970 and 972, continues until the controller 300 determines, at step 970, that delta Ne becomes positive and greater than 0.

At a moment immediately after the controller 300 has determined, at step 970, that delta Ne has become positive, the controller 300 performs, at a step 974, a table look-up operation of the map A using throttle opening degree TH and vehicle speed V to determine a desired engine speed NeA. Then, at the next step 976, the controller 300 computes a deviation D by subtracting the data of NeA from the data of Ne2'. At the next step 978, the controller 300 determines whether the deviation D is less than a predetermined value of −Z or not. If D is greater than or equal to −Z, the controller 300 determines, at the next step 980, whether the deviation D is greater than a predetermined value Z or not. If D is less than or equal to Z, the controller 300 performs, at the step 952, a table look-up operation of the map A using throttle opening degree TH and vehicle speed V to determine a desired engine speed NeA. The controller 300 next updates, at the step 954, the desired engine speed command DSRREV with the desired engine speed NeA.

Mofification of the map B is conducted as follows. If the controller 300 determines at the step 948 that the deviation D is greater than the value Z, the controller 300 conducts, at the next step 956, decrement of data on the shift line of the map B by a predetermined value Y in terms of engine speed. If, at the step 950, it determines that the deviation is less than the value −Z, the controller 300 conducts, at the next step 958, incremenet of data on the shift line of the map B by the predetermined value Y.

Modification of the map C is conducted as follows. If the controller 300 determines at the step 978 that the deviation D is less than the value −Z, the controller 300 conducts, at the next step 982, increment of data on the shift line of the map C by the predetermined value Y in terms of engine speed. If, at the step 980, it determines that the deviation D is greater than the value Z, the controller 300 conducts, at the next step 984, decremenet of data on the shift line of the map C by the predetermined value Y.

What is claimed is:

1. In a control system, for a vehicle drivetrain with an engine having various engine speeds and a continuously variable transmission, including hydraulic means including a ratio control element positionable to various command positions in response to a control signal to establish speed ratios between input and output shafts of the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the ratio control element being positionable to a predetermined one command position of the various command positions in response to the control signal to establish a predetermined one of the speed ratios which provides the maximum reduction ratio and to a second predetermined one command position of the various command positions in response to the control signal to establish a second predetermined one of the speed ratios which provides the minimum reduction ratio, the improvement wherein the controller means determines the desired engine speed as a first function of the operator power demand and the vehicle speed until initiation of a decrease in the actual engine speed after the ratio control element has stayed at the first predetermined command position to provide the maximum reduction ratio;

the controller means determines the desired engine speed as a second function of the operator power demand and the vehicle speed upon and after the initiation of the decrease in the actual engine speed;

the controller means determines the desired engine speed as a third function of the operator power demand and the vehicle speed until initiation of an increase in the actual engine speed after the ratio control element has stayed at the second predetermined command position to provide the minimum reduction ratio; and the controller means determines the desired engine speed as the second function of the operator power demand and the vehicle speed upon and after the initiation of the increase in the actual engine speed.

2. The improvement as claimed in claim 1, wherein the controller means compares the actual engine speed that is detected immediately before the initiation of the decrease in the actual engine speed with the desired engine speed that is determined as the second function immediately before the initiation of the decrease in the actual engine speed; and the controller means modifies the first function in response to the comparison.

3. The improvement as claimed in claim 1, wherein the controller means compares the actual engine speed that is detected immediately before the initiation of the increase in the actual engine speed with the desired engine speed that is determined as the second function immediately before the initiation of the increase in the actual engine speed; and the controller means modifies the third function in response to the comparison.

4. The improvement as claimed in claim 2, wherein, with the same operator power demand, the first function gives, as the desired engine speed, various values lower than various values given by the second function, against various vehicle speeds higher than a predetermined vehicle speed value.

5. The improvement as claimed in claim 3, wherein, with the same operator power demand, the third function gives, as the desired engine speed, various values higher than the various values given by the second function against various vehicle speeds lower than a predetermined vehicle speed value.

6. The improvement as claimed in claim 1, wherein the controller means computes a first difference between the actual engine speed that is detected immediately before the initiation of the decrease in the actual engine speed and the desired engine speed that is determined as the second function immediately before the initiation of the decrease in the actual engine speed;

the controller means modifies the first function in response to the first difference;

the controller means computes a second difference between the actual engine speed that is detected immediately before the initiation of the increase in the actual engine speed and the desired engine speed that is determined as the second function immediately before the initiation of the increase in the actual engine speed; and the controller means modifies the third function in response to the second difference.

7. The improvement as claimed in claim 6, wherein the controller means includes the first function in the form of a look-up table containing eraseable and programmable data which are retrieable, the second function in the form of a look-up table containing data which are retrieveable, and the third function in the form of a look-up table containing data which are retrieveable.

8. In a control system, for a vehicle drivetrain with an engine having various engine speeds and a continuously variable transmission, including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the impovement wherein the controller means determines the desired engine speed as a first function of the operator power demand and the vehicle speed during a predetermined period involving a moment when the ratio control element moves off from a predetermined one command position of the various command positions thereof; and the controller means determines the desired engine speed as a second function of the operator power demand and the vehicle speed during the subsequent period to the predetermined period.

9. The improvement as claimed in claim 8, wherein the controller means compares the actual engine speed with the desired engine speed that is determined as the second function at the initiation of the subsequent period; and the controller means modifies the first function in response to the comparison.

10. In a control system, for a vehicle drivetrain with an engine having various engine speeds and a continuously variable transmission, including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the improvement wherein the controller means determines the desired engine speed as a first function of the operator power demand and the vehicle speed when and after the ratio control element moves off from a predetermined one command position of the various command positions and until a predetermined condition is attained; and the controller means determines the desired engine speed as a second function of the operator power demand and the vehicle speed when and after the predetermined condition is attained.

11. The improvement as claimed in claim 10, wherein the controller means compares the actual engine speed that is detected at a momenet immediately before the predetermined condition is attained with the desired engine speed that is determined as the second function at said moment; and the controller means modifies the first function in response to the comparison.

12. In a control system, for a vehicle drivetrain with an engine having various engine speeds and a continuously variable transmission, including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the ratio control element being positionable to a predetermined one command position of the various command positions in response to the control signal to establish the maximum reduction ratio, the improvement wherein the controller means determines the desired engine speed as a first function of the operator power demand and the vehicle speed until initiation of a decrease in the actual engine speed after the ratio control element has stayed at the predetermined command position to establish the maximum reduction ratio; and the controller means determines the desired engine speed as a second function of the operator power demand and the vehicle speed upon and after the initiation of the decrease in the actual engine speed.

13. The improvement as claimed in claim 12, wherein the controller means compares the actual engine speed that is detected immediately before the initiation of the decrease in the actual engine speed with the desired engine speed that is determined as the second function immediately before the initiation of the decrease in the actual engine speed; and the controller means modifies the first function in response to the comparison.

14. The improvement as claimed in claim 13, wherein, with the same operator power demand, the first function gives, as the desired engine speed, various values lower than various values given by the second function, against various vehicle speeds higher than a predetermined vehicle speed value.

15. In a drivetrain control system including an engine having various engine speeds, a continuously variable transmission including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the improvement wherein the controller means determines the desired engine speed as a first function of the operator power demand and the vehicle speed during a predetermined period involving a moment when the ratio control element moves off from a predetermined one command position of the various command positions thereof; and the controller means determines the desired engine speed as a second function of the operator power demand and the vehicle speed during the subsequent period to the predetermined period.

16. In a drivetrain control system including an engine having various engine speeds, a continuously variable transmission including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the improvement wherein the controller means determines the desired engine speed as a first function of the operator power demand and the vehicle speed when and after the ratio control element moves off from a predetermined one command position of the various command positions and until a predetermined condition is attained; and the controller means determines the desired engine speed as a second function of the operator power demand and the vehicle speed when and after the predetermined condition is attained.

17. In a drivetrain control system including an engine having various engine speeds, a continuously variable transmission including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the ratio control element being positionable to a predetermined one command position of the various command positions in response to the control signal to establish the maximum reduction ratio, the improvement wherein the controller means determines the desired engine speed as a first function of the operator power demand and the vehicle speed until initiation of a decrease in the actual engine speed after the ratio control element has stayed at the predetermined command position to establish the maximum reduction ratio; and the controller means determines the desired engine speed as a second function of the operator power demand and the vehicle speed upon and after the initiation of the decrease in the actual engine speed.

18. In a drivetrain control system including an engine having various engine speeds, a continuously variable transmission including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the ratio control element being positionable to a predetermined one command position of the various command positions in response to the control signal to establish the maximum reduction ratio and to a second predetermined one command position of the various command positions in response to the control signal to establish the minimum reduction ratio, the improvement wherein the controller means determines the desired engine speed as a first function of the operator power demand and the vehicle speed until initiation of a decrease in the actual engine speed after the ratio control element has stayed at the first predetermined command position to establish the maximum reduction ratio;

the controller means determines the desired engine speed as a second function of the operator power demand and the vehicle speed upon and after the initiation of the decrease in the actual engine speed;

the controller means determines the desired engine speed as a third function of the operator power demand and the vehicle speed until initiation of an increase in the actual engine speed after the ratio control element has stayed at the second predetermined command position to establish the minimum reduction ratio; and the controller means determines the desired engine speed as the second function of the operator power demand and the vehicle speed upon and after the initiation of the increase in the actual engine speed.

19. A control method for a drivetrain control system including an engine having various engine speeds, a continuously variable transmission including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the control method comprising the steps of:

determining the desired engine speed as a first function of the operator power demand and the vehicle speed during a predetermined period involving a moment when the control element moves off from a predetermined one command position of the various command positions thereof; and determining the desired engine speed as a second function of the operator power demand and the vehicle speed during the subsequent period to the predetermined period.

20. A control method for a drivetrain control system including an engine having various engine speeds, a continuously variable transmission including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the control method comprising the steps of:

determining the desired engine speed as a first function of the operator power demand and the vehicle speed when and after the ratio control element moves off from a predetermined one command position of the various command positions and until a predetermined condition is attained; and determining the desired engine speed as a second function of the operator power demand and the vehicle speed when and after the predetermined condition is attained.

21. A control method for a drivetrain control system including an engine having various engine speeds, a continuously variable transmission including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the ratio control element being positionable to a predetermined one command position of the various command positions in response to the control signal to establish the maximum reduction ratio, the control method comprising the steps of:

determining the desired engine speed as a first function of the operator power demand and the vehicle speed until initiation of a decrease in the actual engine speed after the ratio control element has stayed at the predetermined command position to establish the maximum reduction ratio; and determining the desired engine speed as a second function of the operator power demand and the vehicle speed upon and after the initiation of the decrease in the actual engine speed.

22. A control method for a drivetrain control system including an engine having various engine speeds, a continuously variable transmission including hydraulic means including a ratio control element positionable to various command positions in response to a control signal to establish reduction ratios in the continuously variable transmission, and controller means developing a command indicative of the desired engine speed in response to operator power demand and the vehicle speed, developing the control signal in such a manner as to bring the actual engine speed into agreement with the desired engine speed and applying the control signal to the ratio control element, the ratio control element being positionable to a predetermined one command position of the various command positions in response to the control signal to establish the maximum reduction ratio and to a second predetermined one command position of the various command positions in response to the control signal to establish the minimum reduction ratio, the control method comprising the steps of:

determining the desired engine speed as a first function of the operator power demand and the vehicle speed until initiation of a decrease in the actual engine speed after the ratio control element has stayed at the first predetermined command position to establish the maximum reduction ratio;

determining the desired engine speed as a second function of the operator power demand and the vehicle speed upon and after the initiation of the decrease in the actual engine speed;

determining the desired engine speed as a third function of the operator power demand and the vehicle speed until initiation of an increase in the actual engine speed after the ratio control element has stayed at the second predetermined command position to establish the minimum reduction ratio; and determining the desired engine speed as the second function of the operator power demand and the vehicle speed upon and after the initiation of the increase in the actual engine speed.

* * * * *